(12) United States Patent
Lin et al.

(10) Patent No.: US 9,557,840 B2
(45) Date of Patent: Jan. 31, 2017

(54) DISPLAYS WITH INTRA-FRAME PAUSE

(71) Applicant: Apple Inc., Cupertino, CA (US)

(72) Inventors: Chin-Wei Lin, Cupertino, CA (US);
Chun-Yao Huang, Cupertino, CA (US);
Shih Chang Chang, Cupertino, CA (US); Szu-Hsien Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/489,338

(22) Filed: Sep. 17, 2014

(65) Prior Publication Data
US 2015/0220194 A1 Aug. 6, 2015

Related U.S. Application Data

(60) Provisional application No. 61/935,772, filed on Feb. 4, 2014.

(51) Int. Cl.
*G06F 3/041* (2006.01)
(52) U.S. Cl.
CPC .......... *G06F 3/0412* (2013.01); *G06F 3/0416* (2013.01)
(58) Field of Classification Search
CPC .............................. G06F 3/0416; G06F 3/0412
USPC ........................................................ 345/173
See application file for complete search history.

(56) References Cited

U.S. PATENT DOCUMENTS

| | | | |
|---|---|---|---|
| 7,696,975 B2 | 4/2010 | Yang et al. | |
| 8,362,999 B2 | 1/2013 | Huang et al. | |
| 8,766,961 B2 | 7/2014 | Huang et al. | |
| 2010/0253638 A1* | 10/2010 | Yousefpor | G06F 3/0416 345/173 |
| 2012/0154322 A1 | 6/2012 | Yang et al. | |
| 2012/0229444 A1* | 9/2012 | Ochiai | G11C 19/184 345/213 |
| 2013/0328757 A1 | 12/2013 | Matsumoto et al. | |
| 2014/0049512 A1* | 2/2014 | Yang | G06F 3/0416 345/174 |
| 2014/0139460 A1* | 5/2014 | Wu | G06F 3/0416 345/173 |
| 2014/0354590 A1 | 12/2014 | Wang et al. | |
| 2014/0362052 A1 | 12/2014 | McCaughan et al. | |

FOREIGN PATENT DOCUMENTS

CN 103455201 12/2013

* cited by examiner

*Primary Examiner* — Jonathan Blancha
(74) *Attorney, Agent, or Firm* — Treyz Law Group, P.C.; Jason Tsai

(57) ABSTRACT

A touch screen display may include gate line driver circuitry coupled to a display pixel array. The display may be provided with intra-frame pausing (IFP) capabilities, where touch or other operations may be performed during one or more intra-frame blanking intervals. In one suitable arrangement, a gate driver circuit may include multiple gate line driver segments each of which is activated by a separate gate start pulse. Each gate start pulse may only be released at the end of an IFP interval. In another suitable arrangement, dummy gate driver units may be interposed among active gate driver units. Gate output signals may propagate through the dummy gate driver units during the IFP internal. In another suitable arrangement, each active gate driver unit may be provided with a buffer portion that protects at least some transistor in the gate driver unit from undesired stress.

16 Claims, 16 Drawing Sheets

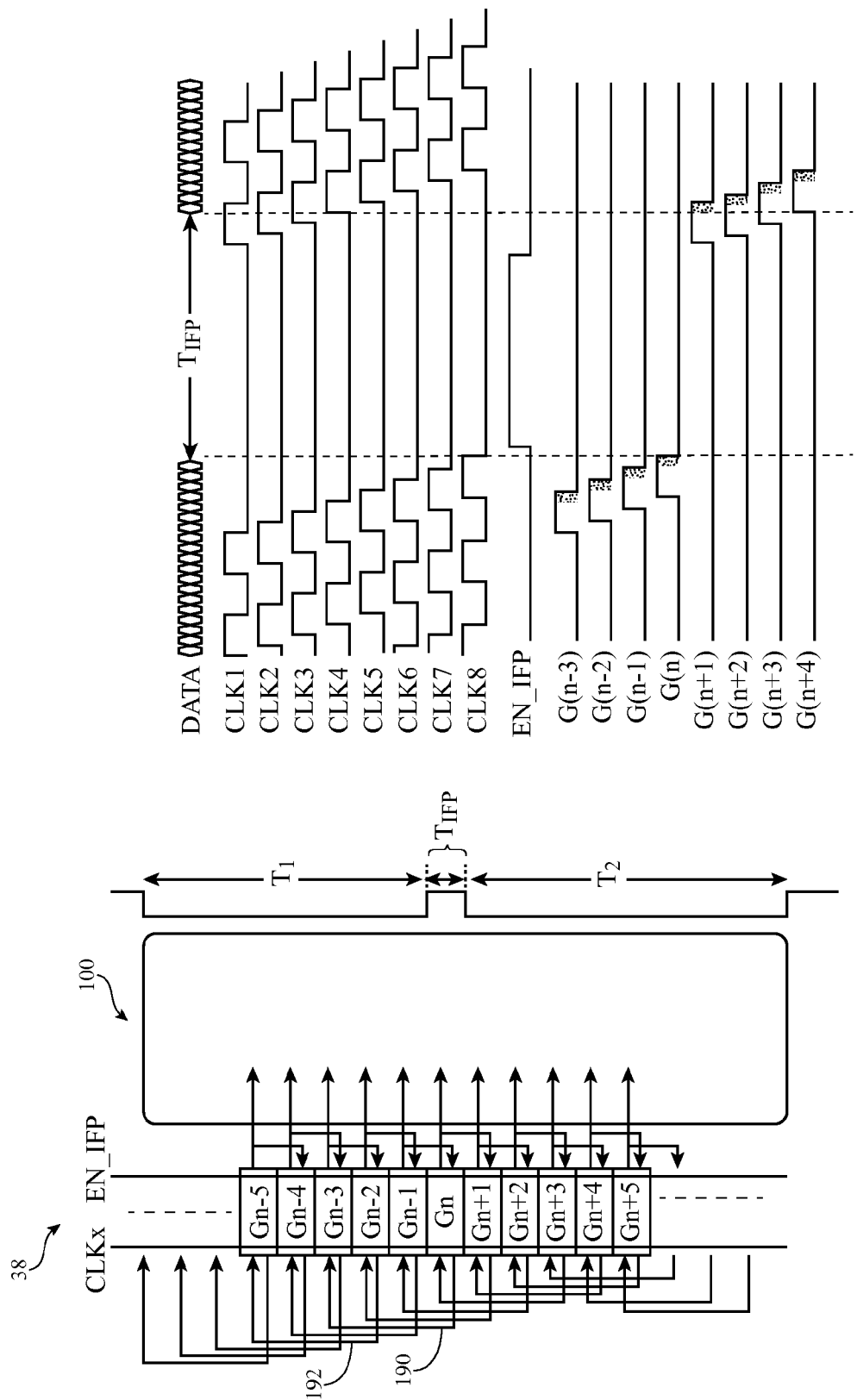

DISPLAYS WITH INTRA-FRAME PAUSE

This application claims the benefit of provisional patent application No. 61/935,772, filed Feb. 4, 2014, which is hereby incorporated by reference herein in its entirety.

BACKGROUND

This relates generally to electronic devices, and more particularly, to electronic devices with touch screen displays.

Touch screen displays are prevalent in many applications, including consumer electronics devices such as smartphones, tablet devices, and laptop and desktop computers. The display function in such devices is typically performed by a liquid crystal display (LCD), plasma, or organic light emitting diode (OLED) display element, array that is connected to a grid of source (data) and gate (select) metal traces. The display element array is often formed on a transparent panel such as a glass panel, which serves as a protective shield. The data and select lines of the display element array may be driven by a display driver integrated circuit (IC). The driver IC receives an image or video signal, which it then decodes into raster scan pixel values (color or gray scale) and writes them to the display element array during each frame, by driving the data and select lines. This process is repeated at a high enough frame rate so as to render video.

The touch gesture detection function in such devices is typically performed using a capacitance sensing subsystem in which a touch transducer grid, structure overlays the display element array. The touch transducer structure is stimulated and sensed by touch controller circuitry. A touch stimulus signal is applied to the row segments of the grid, while simultaneously sensing the column segments (to detect a single-touch or a multi-touch gesture). Touch detection is typically performed during a blanking interval portion of the frame, while the display function is performed during a display interval portion of the frame.

The touch transducer grid structure can be implemented as a light transparent electrode plate that covers the display element array and may be formed on a rear surface of the protective panel. In some cases, the transparent electrode plate is also connected to the display elements, serving to deliver a "common voltage" to the display elements from a voltage source circuit often referred to as a Vcom conditioning circuit. The Vcom conditioning circuit helps improve the display function by adjusting a voltage on the transparent conductor plate that changes the light modulation characteristics of the connected display elements (during the display interval). As such, the transparent electrode plate is dual purposed in that it is used for both the display function and as the touch transducer grid structure.

As such, the touch screen display alternates between the display interval during which the display element array is activated and the blanking (or touch) interval during which the touch gesture detection function is activated. During each display interval, an entire frame is loaded into the display element array. The touch interval is typically positioned between successive display intervals (i.e., each touch interval occurs only after an entire frame has been scanned in). Performing inter-frame touch detection in this way may not be frequent enough for certain applications.

SUMMARY

An electronic device having a liquid crystal display (LCD) is provided. The liquid crystal display may include display pixel circuitry formed on a glass substrate. Thin-film transistor structures may be formed on the glass substrate.

The display pixel circuitry may include a display pixel array and gate driver circuitry coupled to the array. The gate driver circuitry may include at least one gate driver circuit that is formed on one side of the array. The gate driver circuit may include multiple gate driver units, each of which is configured to output a gate line output signal to display pixels arranged along a corresponding row in the array.

The display pixel circuitry may be used to output a given image/video frame. The gate driver circuitry may be configured to load a first sub-frame in the given frame during a first display interval and to load a second sub-frame in the given frame during a second display interval. Touch sensing operations may be performed dining an intra-frame blanking interval (sometimes referred to as an intra-frame pause) inserted immediately after the first display interval and immediately before the second display interval.

In one embodiment, the gate driver circuit may include multiple gate driver segments, each of which can be controlled by a respective gate start signal. Each of the multiple gate driver segments may include active gate driver units coupled in a chain a first dummy gate driver unit coupled to the first active gate driver unit in the chain, and a second dummy gate driver unit coupled to the last active gate driver unit in the chain. The gate start signals may only be released at the end of the blanking interval. Configured in this way, the active gate driver units are not exposed to elevated stress levels during the blanking interval.

In another suitable embodiment, the gate driver circuit may include active gate driver units connected in a chain, a first dummy gate driver unit connected to a leading active gate driver unit in the chain, a second dummy gate driver unit connected to the trailing active gate driver unit in the chain, and multiple dummy gate driver units interposed, within the chain. The chain of gate driver units may be controlled by a single gate start pulse. During the blanking interval, gate line output signals May propagate through the interposing dummy gate driver units. Configured in this way, the active gate driver units are not exposed to elevated stress levels during the blanking interval.

In some embodiments, the active gate driver unit may be provided with memory circuitry. For example, the active gate driver unit may include a driving transistor coupled to a first bootstrapping capacitor, and a second memory transistor coupled to a second bootstrapping capacitor. During intra-frame blanking intervals gate line signals from preceding gate driver units may be temporarily stored at the gate terminal of the memory transistor while the gate terminal of the driving transistor is reset. In particular, the gate driver unit may receive feed-forward gate output signals from at least two different preceding gate driver units in the chain and may receive feed-back gate output signals from at least two different succeeding gate driver units in the chain. Operated in this way, the driving transistor is not subject to elevated stress levels during the blanking interval.

Further features of the present invention, its nature and various advantages will be more apparent from the accompanying drawings and the following detailed description.

BRIEF DESCRIPTION OF THE DRAWINGS

FIG. 6A is a diagram showing gate driver circuitry formed on only one side of a display pixel array in accordance with an embodiment of the present invention.

FIG. 6B is a timing diagram showing how the gate driver circuitry of FIG. 6A may be used to provide IFP capabilities in accordance with an embodiment of the present invention.

DETAILED DESCRIPTION

Displays are widely used in electronic devices. For example, displays may be used in computer monitors, laptop computers, media players, cellular telephones and other handheld devices, tablet computers, televisions, and other equipment. Displays may be based on plasma technology, organic-light-emitting-diode technology, crystal structures, etc. Liquid crystal displays are popular because they can exhibit low power consumption and good image quality. Liquid crystal display structures are sometimes, described herein as an example.

Figure 1:
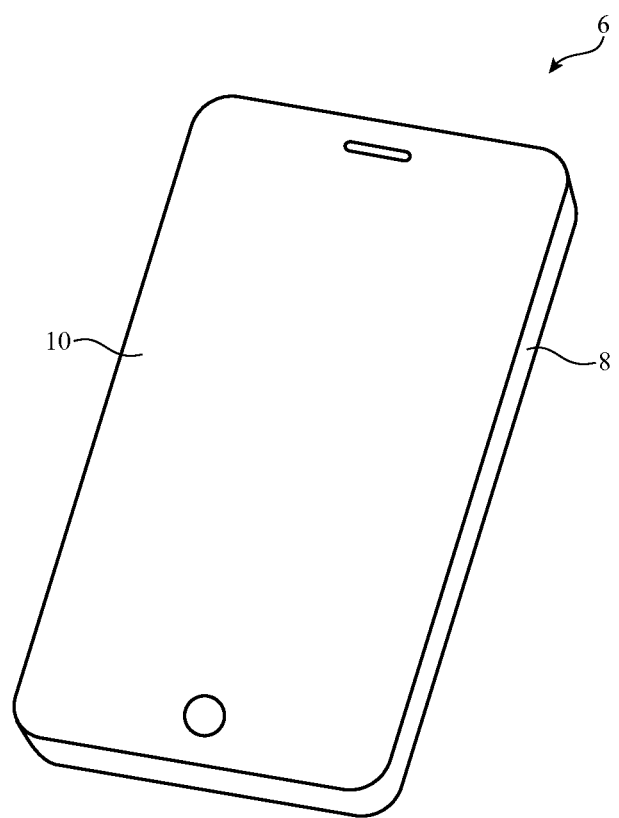
FIG. 1 is a perspective view of an illustrative display such as a liquid crystal display in accordance with an embodiment of the present invention.

A perspective view of an illustrative electronic device with a display is shown in FIG. 1. As shown in FIG. 1, electronic device 6 may have a housing such as housing 8. Housing 8 may be formed from materials such as plastic, glass, ceramic, metal, fiber composites, and combinations of these materials. Housing 8 may have one or more sections. For example, device 6 may be provided with a display housing portion and a base housing portion that are coupled by hinges. In the arrangement of FIG. 1, device 6 has a front face and a rear face. Display 10 of FIG. 1 is mounted on the front face of housing 8. Other configurations may be used if desired.

Display 10 may be a liquid crystal display. A touch sensor array may be incorporated into display 10 (e.g., to form a touch screen display). The touch sensor may be based on acoustic touch technology force sensor technology resistive sensor technology, or other suitable types of touch sensor. With one suitable arrangement, the touch sensor portion of display 10 may be formed using a capacitive touch sensor arrangement. With this type of configuration, display 10 may include a touch sensor array that is formed from rows and columns of capacitive touch sensor electrodes.

Figure 2:
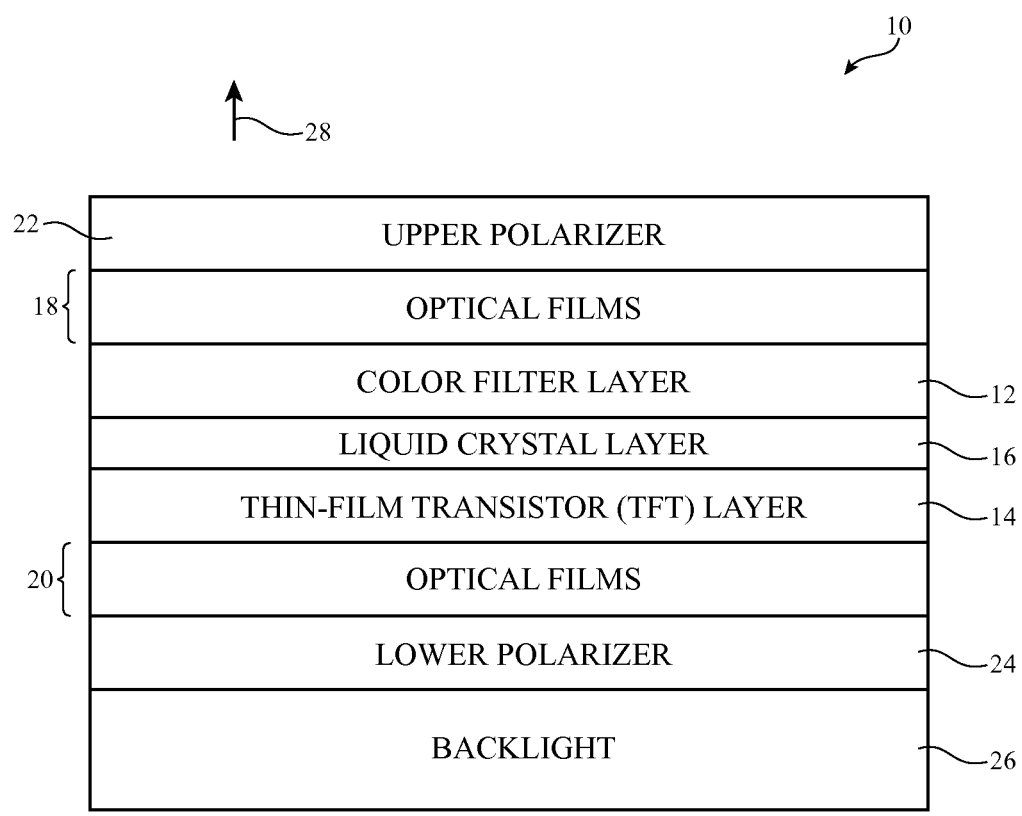
FIG. 2 is cross-sectional side view of an illustrative display in accordance with an embodiment of the present invention.

A cross-sectional side view of a portion of a display of the type that may be used in forming display 10 of FIG. 1 is shown in FIG. 2. As shown in FIG. 2, display 10 mass include color filter (CF) layer 12 and thin-film-transistor (TFT) layer 14. Color filter layer 12 may include an array of colored filter elements. In a typical arrangement, the pixels of layer 12 each include three types of colored pixels (e.g., red, green, and blue subpixels). Liquid crystal (LC) layer 16 includes liquid crystal material and is interposed between color filter layer 12 and thin-film-transistor layer 14. Thin-film-transistor layer 14 may include electrical components such as thin film transistors, capacitors, and electrodes for controlling the electric fields that are applied to liquid crystal layer 16. Optical film layers 18 and 20 may be formed above and below color filter layer 12 liquid crystal layer 16, and thin-film-transistor layer 14. Optical films 18 and 20 may include structures such as quarter-wave plates, half-wave plates, diffusing films, optical adhesives, and birefringent compensating layers.

Display 10 may have upper and lower polarizer layers 22 and 24. Backlight 26 may provide backside illumination for display 10. Backlight 26 may include a light source such as a strip of light-emitting diodes. Backlight 26 may also include a light-guide plate and a back reflector. The hack reflector may be located on the lower surface of the light-guide panel to prevent light leakage. Light from the light source may be injected into an edge of the light-guide panel and may scatter upwards in direction 28 through display 10. An optional cover layer such as a layer of coverglass may be used to cover and protect the layers of display 10 that are shown in FIG. 2.

Touch sensor structures may be incorporated into one or more of the layers of display 10. In a typical touch sensor configuration, an array of capacitive touch sensor electrodes may be implemented using pads and/or strips of a transparent conductive material such as indium tin oxide. Other touch technologies may be used if desired (e.g., resistive touch, acoustic touch, optical touch, etc.). Indium tin oxide or other transparent conductive materials or non-transparent conductors ma also be used in forming signal lines in display 10 (e.g., structures for conveying data, power, control signals, etc.).

In black and white displays, color filter layer 12 can be omitted. In color displays, color filter layer 12 can be used to impart colors to an array of image pixels. Each image pixel may, for example, have three corresponding liquid crystal diode subpixels. Each subpixel may be associated with a separate color filter element in the color filter array. The color filter elements may, for example, include red (R) color filter elements, blue (B) color filter elements, and green (G) color filter elements. These elements may be arranged in rows and columns. For example, color filter elements can be arranged in stripes across the width of display 10 (e.g., in a repeating patterns such as a RBG pattern or BRG pattern) so that the color filter elements in each column are the same (i.e., so that each column contains all red elements, all blue elements, or all green elements). By controlling the amount of light transmission through each subpixel, a desired colored image can be displayed.

The amount of light transmitted through each subpixel can be controlled using display control circuitry and electrodes. Each subpixel may, for example, be provided with a transparent indium tin oxide electrode. The signal on the subpixel electrode, which controls the electric field through an associated portion of the liquid crystal layer and thereby controls the light transmission for the subpixel, may be applied using a thin film transistor. The thin film transistor may receive data signals from data lines and, when turned on by an associated gate line, may apply the data line signals to the electrode that is associated with that thin-film transistor.

Figure 3:
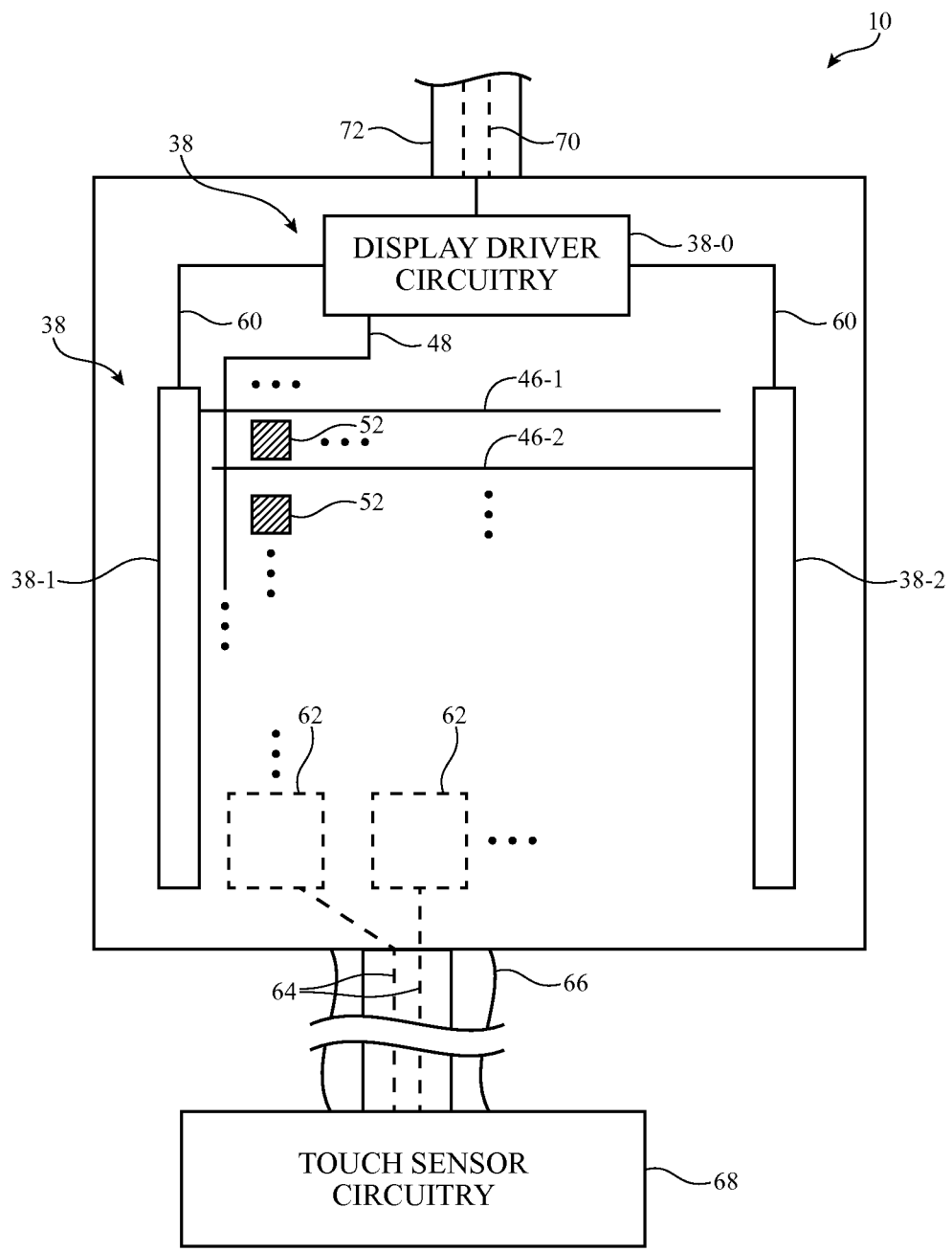
FIG. 3 is an illustrative diagram showing how a display may be provided with image pixel structures and touch sensor elements in accordance with an embodiment of the present invention.

A top view of an illustrative display is shown in FIG. 3. As shown in FIG. 3, display 10 may include an array of image pixels 52. Pixels 52 (which are sometimes referred to as subpixels) may each be formed from electrodes that give rise to an electric field and a portion of liquid crystal layer 16 FIG. 2) that is controlled by that electric field. Each image pixel may have an electrode that receives a data line signal from an associated transistor and a common electrode. The common electrodes of display 10 may be formed from a layer of patterned indium tin oxide or other conductive planar structures. The patterned indium tin oxide structure or other conductive structures that are used in forming the common plane for image pixels 52 may also be used in forming capacitive touch sensor elements 62.

As illustrated by touch sensor elements 62 of FIG. 3, touch sensor elements (electrodes) may be coupled to touch sensor circuitry 68. Touch sensor elements 62 may include rectangular pads of conductive material, vertical and/or horizontal strips of conductive material, and other conductive structures. Signals from elements 62 may be routed to touch sensor processing circuitry 68 via traces 64 on flex circuit cable 66 or other suitable communications path lines.

In a typical arrangement, there are fewer capacitor electrodes 62 in display 10 than there are image pixels 52, due to the general desire to provide more image resolution than touch sensor resolution. For example, there ma be hundreds or thousands of rows and/or columns, of pixels 52 in display 10 and only tens or hundreds of rows and/or columns of capacitor electrodes 62.

Display ID may include display driver circuitry 38. Display driver circuitry 38 may receive image data from processing circuitry in device 6 using conductive lines 70 in path 72. Path 72 may be for example, a flex circuit cable or other communications path that couples display driver circuitry 38 to integrated circuits on a printed circuit board elsewhere in device 6 (as an example).

Display driver circuitry 38 may include control circuit 38-0, gate line driver circuit 38-1, and gate line driver circuit 38-2. Display driver control circuit 38-0 may be implemented using one or more integrated circuits (e.g., one or more display driver integrated circuits). Circuits 38-1 and 38-2 (sometimes referred to as gate line and Vcom driver circuitry) may be incorporated into control circuit 38-0 or may be implemented using thin-film transistors on layer 14 (FIG. 2). Gate line driver circuits 38-1 and 38-2 implemented using thin-film transistor structures on layer 14 may sometimes be referred to as gate driver on array or "GOA." Paths such as paths 60 may be used to interconnect display driver circuitry 38. Display driver circuitry 38 may also be implemented using external circuits or other combinations of circuitry, desired.

Display driver circuitry 38 may control the operation of display 10 using a grid of signal lines such as data lines 48, gate lines 46, and Vcom lines (not shown). In the example of FIG. 3, gate driver circuit 38-1 may serve to provide gate line signals to display pixels 52 arranged along even rows in the array (e.g., by supplying gate line signals on even gate lines 46-1), whereas gate driver circuit 38-2 may serve to provide gate line signals to display pixels 52 arranged along odd rows in the array (e.g., by supplying gate line signals on odd gate lines 46-2). This type of interlaced driving scheme in which gate line driver circuits drive signals from two different sides of the array in this way is merely illustrative. In general gate drivers may be formed on only one side, or on more than two sides of the image pixel array.

Note that the touch function may be performed during a touch interval portion of the video frame, and in particular during a blanking interval (rather than during a display interval) of the video frame. In conventional displays, the touch interval is typically inserted only between successive display intervals that each display an entire image/video frame (i.e., conventional touch screen displays are only configured in implement inter-frame pause for touch sensing).

Figure 4:
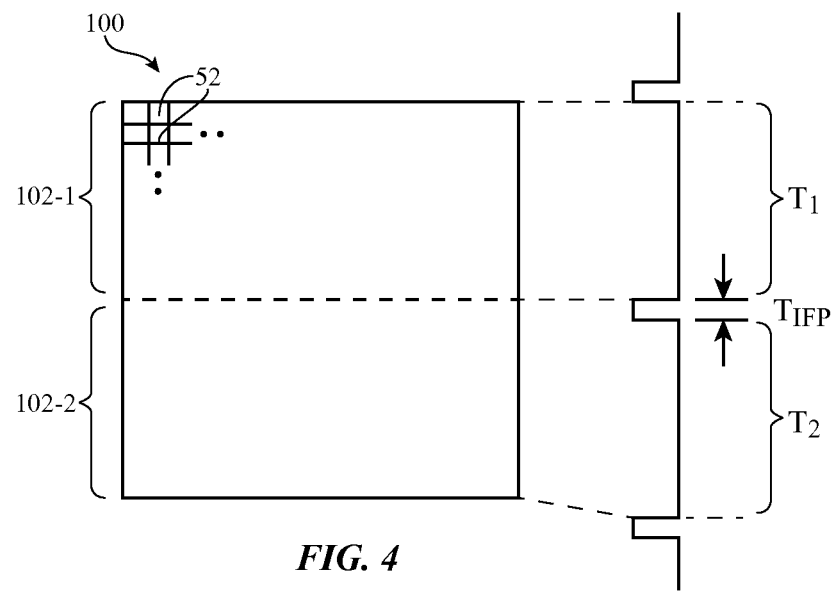
FIG. 4 is a diagram illustrating a single intra-frame pause (IFP) in accordance with an embodiment of the present invention.

In some arrangements it may be desirable to perform touch sensing at more frequent intervals. In accordance with an embodiment of the present invention, display 10 may be configured to implement an intra-frame pausing (IFP) scheme to allow touch sensing operations to be performed at relatively higher frequencies compared to the inter-frame pausing scheme. FIG. 4 is a diagram showing a single IFP. As shown in FIG. 4, a display pixel array 100 that includes image pixels 52 arranged in rows and columns may be organized into a first sub-frame 102-1 and a second sub-frame 102-2. First sub-frame 102-1 may be loaded with new display data during time period T1, whereas second sub-frame 102-2 may be loaded with new display data during time period T2. To implement a single IFP, an initial blanking interval may occur prior to loading first sub-frame 102-1 (i.e., immediate prior to period T1), and a single IFP blanking interval may be inserted after loading of first sub-frame 102-1 and prior to loading of second sub-frame 102-2 (i.e., between periods T1 and T2). After the second sub-frame 102-2 has been loaded with new display data the steps described above may be repeated for the next frame.

Each blanking interval may have a duration $T_{IFP}$ during which touch sensing operations or other display/non-display related operations may be performed. The example of FIG. 4 in which the IFP is inserted at the middle of the frame is merely illustrative. If desired, the position of the IFP may be adjusted (e.g., the intra-frame pause may be inserted more towards the top of the frame or more towards the bottom of the frame). If desired, the duration of each blanking interval can also be adjusted (e.g., period $T_{IFP}$ may be adjusted).

Figure 5:
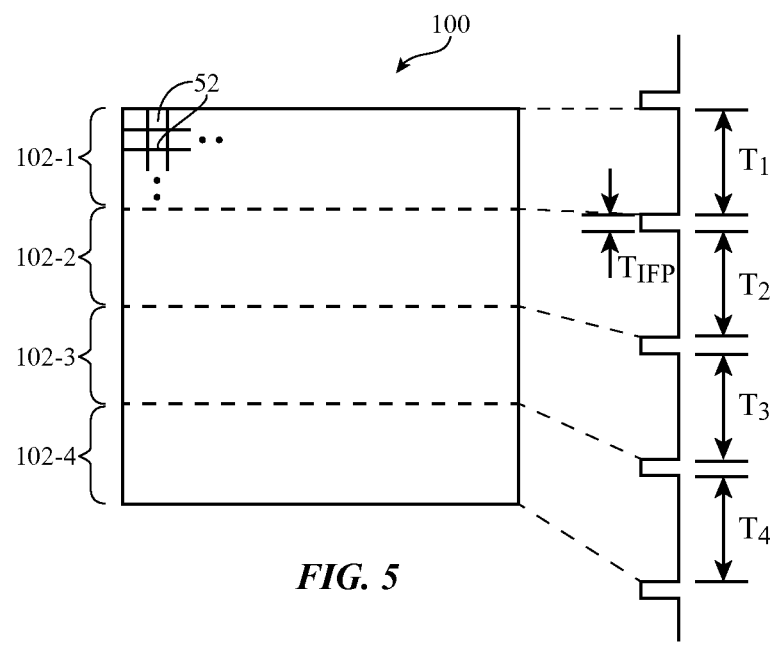
FIG. 5 is a diagram illustrating multiple intra-frame pauses (IFPS) in accordance with an embodiment of the present invention.

In other suitable arrangements, multiple IFPs may be inserted within a single frame (see. FIG. 5). As shown in FIG. 5, display pixel array 100 may be organized into a first sub-frame 102-1, second sub-frame 102-2, a third sub-frame 102-3, and a fourth sub-frame 102-4, each of which displays data for a quarter of the entire frame. First sub-frame 102-1 may be loaded with new display data during display interval T1; second sub-frame 102-2 may be loaded with new display data during display interval T2; third sub-frame 102-3 may be loaded with new display data during display interval T3; and fourth sub-frame 102-4 may be loaded with new display data during display interval T4. To implement multiple IFPS in this scenario, an initial blanking interval may occur prior to loading first sub-frame 102-1 (i.e., immediate prior to period T1), a first IFP blanking interval may be inserted after accessing sub-frame 102-1 and prior to accessing sub-frame 102-2 (i.e., between periods T1 and T2), a second IFP blanking interval may be inserted after accessing sub-frame 102-2 and prior to accessing sub-frame 102-3 (i.e., between periods T2 and T3), a third IFP blanking interval may be inserted after accessing sub-frame 102-3 and prior to accessing sub-frame 102-4 (i.e., between periods T3 and T4). After the fourth sub-frame 102-4 has been loaded with new display data, the steps described above may be repeated for the next frame.

The example of FIG. 5 in which the IFP is inserted at regular intervals within the frame is merely illustrative. In general, any number of IFPs may be inserted at any suitable location within the frame. If desired, the duration of each blanking interval may be adjusted, and the duration of each IFP blanking interval need not be the same.

FIG. 6A is a diagram of a display having gate line driver circuitry 38 formed on only one side of display pixel array 100. As shown in FIG. 6A, gate line driver circuitry 38 may include a series of gate line driver units connected in a chain. A given gate line driver unit in the chain may be referred to as gate line driver unit "n" that is configured to output a corresponding gate line output signal G(n). The gate line driver unit preceding the given driver unit in the chain may be referred to as gate line driver unit "(n−1)" that is configured to output a corresponding gate line output signal G(n−1). The gate line driver unit following the given driver unit in the chain may be referred to as gate line driver unit "(n+1)" that is configured to output a corresponding gate line output signal G(n+1). Driver units preceding unit (n−1) may be referred to as units (n−2), (n−3), (n−4) . . . , whereas drivers units succeeding unit (n+1) may be referred to as units (n+2), (n+3), (n+4), etc.

In the example of FIG. 6A, each gate driver unit has an output that is coupled to an input of a subsequent gate driver unit via a feed-forward path. For example, gate line output G(n−1) may be routed to unit n; gate line output G(n) may be routed to unit (n+1), gate line output G(n+1) may be routed to unit (n+2), etc. Connected in this way, an asserted gate time pulse signal can be propagated down the chain of gate driver units to provide desired raster scanning (e.g., so that new display pixel values can be sequentially written into the display pixel array on a row-by-row basis).

The output of each gate driver unit may also be fed hack to a corresponding gate driver unit that is three rows above that gate driver unit. For example, gate line output G(n) may be fed back to unit (n−3) as indicated by feed-back path 190. As another example, gate line output signal G(n−2) may be fed back to unit (n−5), as indicated by path 192. Connected in this way, the output signal of a second gate driver unit subsequent to (but not necessarily immediately following) a first gate driver unit in the chain may be used to "reset" the gate line output signal of the first gate driver unit (e.g., assertion of the output signal generated by the second gate driver unit may drive the output signal of the first gate driver unit low). This is merely exemplary. The output of each gate driver unit may be fed back to any suitable preceding gate driver unit (i.e., the output of a given gate driver unit may be fed back to a corresponding gate driver unit that is less than three rows above the given gate driver unit or more than three rows above the given gate driver unit).

Gate driver circuitry 38 may receive gate clock signals CLKx and an IFP control signal EN_IFP. Control signal EN_IFP may serve as an enable signal that activates the blanking interval when asserted and that permits the display interval when deasserted. FIG. 6B is a timing diagram that illustrates the behavior of relevant signals during the operation of gate driver circuitry 38 of the type shown in FIG. 6A. As shown in FIG. 6B, active data signals provided on data lines 48 (FIG. 3) may be loaded into corresponding rows in the display pixel array during the display intervals. During, the display or "non-blanking" intervals (e.g., when enable signal EN_IFP is deasserted), clock signals CLK1-8 direct the gate driver units to sequentially assert the gate line output signals. The number of clock signals in this example is merely illustrative. In general, any number of clock signals CLKx may be used to control the various gate line driver units.

In the example of FIG. 6B, the IFP is inserted after G(n) is asserted. During the IFP blanking interval, enable signal EN_IFP is asserted. While EN_IFP is asserted, the clock signals CLKx are temporarily suspended, which prevents any gate line signals from being generated (e.g., no display pixels are being accessed during the blanking intervals). At the end of the IFP blanking interval, signal EN_IFP is deasserted, which allows the clock signals to toggle and to continue generating gate line output signals G(n+1), G(n+2), G(n+3), and so no until the next blanking interval.

Figure 7A:
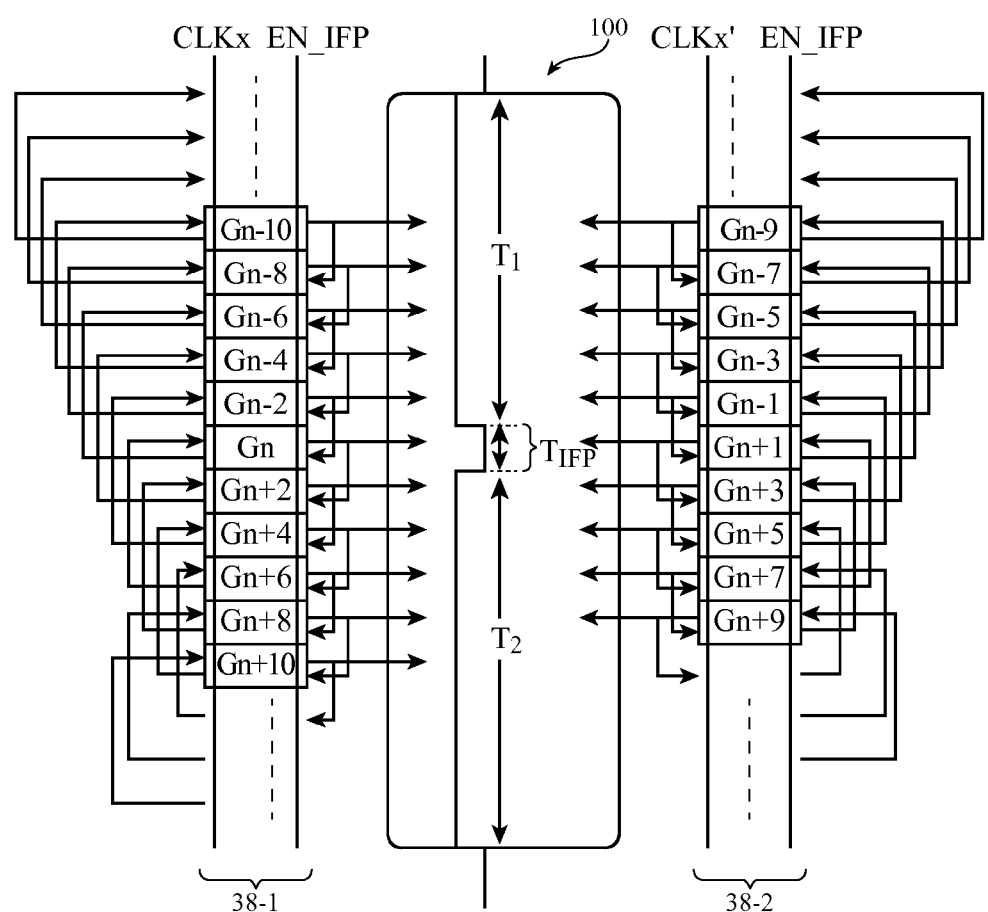
FIG. 7A is a diagram showing gate driver circuitry formed on two opposing sides of a display pixel array in accordance with an embodiment of the present invention.

FIG. 7A is a diagram of a display having gate line driver circuits 38 formed on at least two opposing sides of display pixel array 100. As shown in FIG. 7A, a first gate line driver circuit 38-1 may be formed on a first edge of array 100, whereas a second gate line driver circuit 38-2 may be formed on a second opposing edge of array 100. Each gate line driver circuits 38-1 and 38-2 may include multiple gate line driver units coupled in a chain. Gate line driver circuit 38-1 may include gate line driver units that are used to generate gate line output signals G(n−4), G(n−2), G(n), G(n+2), G(n+4), etc. for "even" pixel rows in the array, whereas 38-2 may include gate line driver units that are used to generate gate line output signals G(n−3), G(n−1), G(n+1), G(n+3), G(n+5), etc. for "odd" pixel rows in the array.

Even row gate driver circuit 38-1 may receive gate clock signals CLKx and an IFP control signal EN_IFP, whereas odd row gate driver circuit 38-2 may receive gate clock signals CLKx' and control signal EN_IFP. The clock signals controlling the gate driver units in circuit 38-1 may be different or may be the same as those controlling the gate driver units in circuit 38-2. Similarly, signal EN_IFP controlling the gate driver units in circuit 38-1 may be the same or may be different than that controlling the gate driver units in circuit 38-2.

Figure 7B:
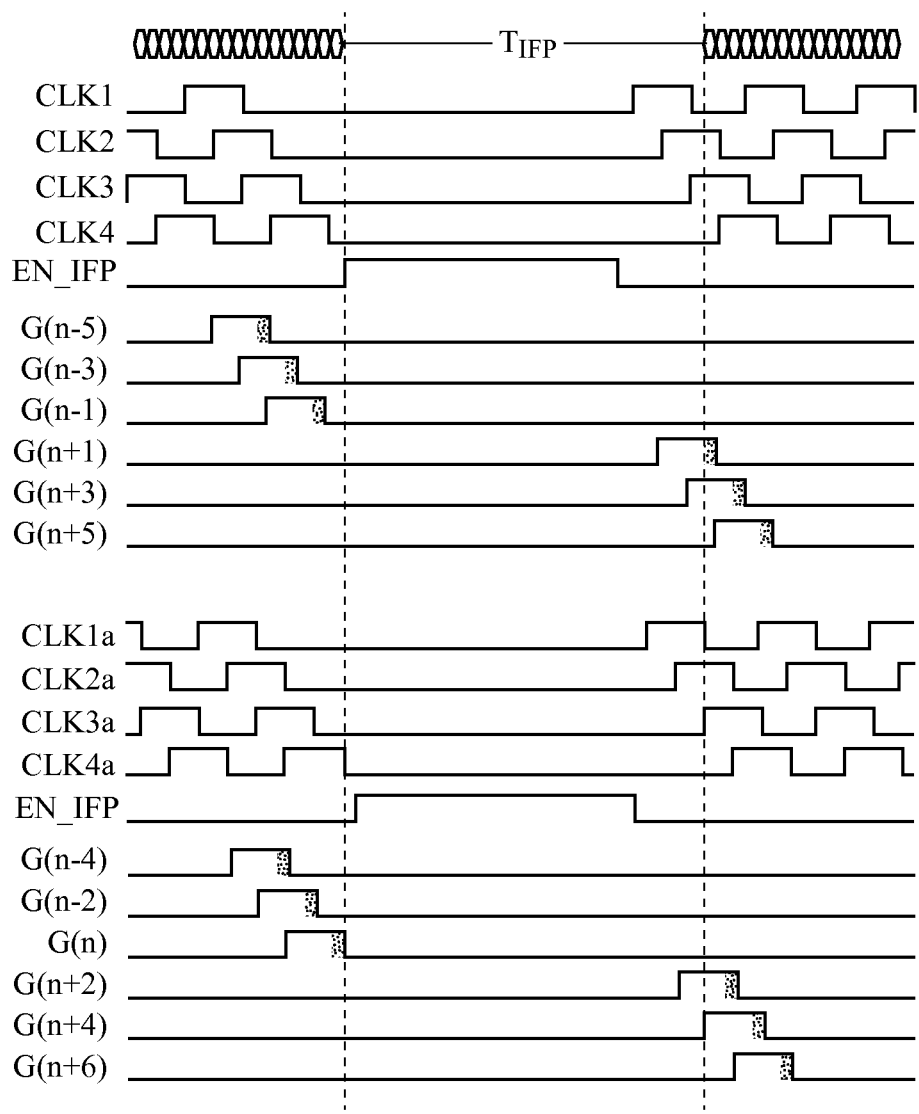
FIG. 7B is a timing diagram showing how the gate driver circuitry of FIG. 7A may be used to provide IFP capabilities in accordance with an embodiment of the present invention.

FIG. 7B is a timing diagram that illustrates the behavior of relevant signals during the operation of gate driver circuitry 38 of the type shown in FIG. 7A. As shown in FIG. 7B, active data signals provided on data lines 38 (FIG. 3) may be loaded into corresponding rows in the display pixel array during the display intervals. During the display or "non-blanking" intervals (e.g., when enable signal EN_IFP is deasserted) clock signals CLK1-4 may direct the even gate driver units to sequentially assert the gate line output signals while clock signals CLK1a-4a may direct the odd driver units to sequentially assert the gate line output signals. The number of clock signals in this example is merely illustrative. In general, any number of clock signals CLKx may be used to control the various gate line driver units.

In the example of FIG. 7B, the IFP is inserted after G(n) is asserted by circuit 38-1 and after G(n−1) is asserted by circuit 38-2. During the IFP blanking interval enable signal EN_IFP is asserted. While EN_IFP is asserted, the clock signals CLK1-4 and CLK1a-4a are temporarily suspended, which prevents any gate line signals from being generated (e.g., no display pixels are being accessed during the blanking intervals). At the end of the IFP blanking interval, signal EN_IFP is deasserted, which allows the clock signals to toggle and to continue generating gate line output signals G(n+1), G(n+2), G(n+3), and so no until the next blanking interval.

Figure 8:
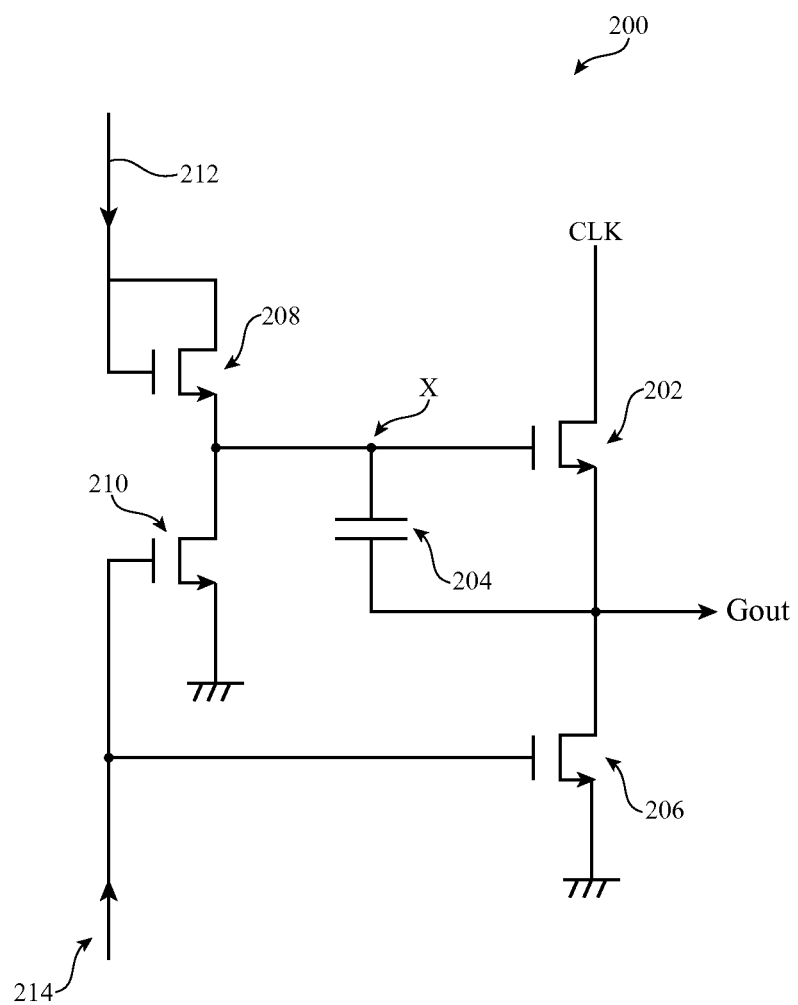
FIG. 8 is a circuit diagram of a conventional gate driver unit.

FIG. 8 is a circuit diagram of a conventional gate line driver unit 200. Gate driver unit 200 includes a capacitor 204 and n-channel transistors 202, 206, 208, and 210. Transistor 202 has a drain terminal that receives a clock signal CLK, a gate terminal that is connected to an intermediate node X, and a source terminal that is connected to the output of unit 200 (i.e., an output terminal on which Gout is provided). Capacitor 204 has a first terminal, that is connected to node X and a second terminal that is connected to the source terminal of transistor 202. Transistor 206 has a drain terminal that is connected, to the source terminal of transistor 202, a gate terminal, and a source terminal that is connected to a ground line.

Transistor 208 has a source terminal that is connected to node X, a drain terminal, and a gate terminal that is connected to its drain terminal. Transistor 210 has a drain terminal that is connected to node X, a source terminal that is connected to the ground line, and a gate terminal. The gate and drain terminals of transistor 208 are connected to the gate line output of a preceding gate driver unit via feed-forward path 212, whereas the gate terminals of transistors 206 and 210 are connected to the gate line output of a succeeding gate driver unit via feed-back path 214.

Figure 9:
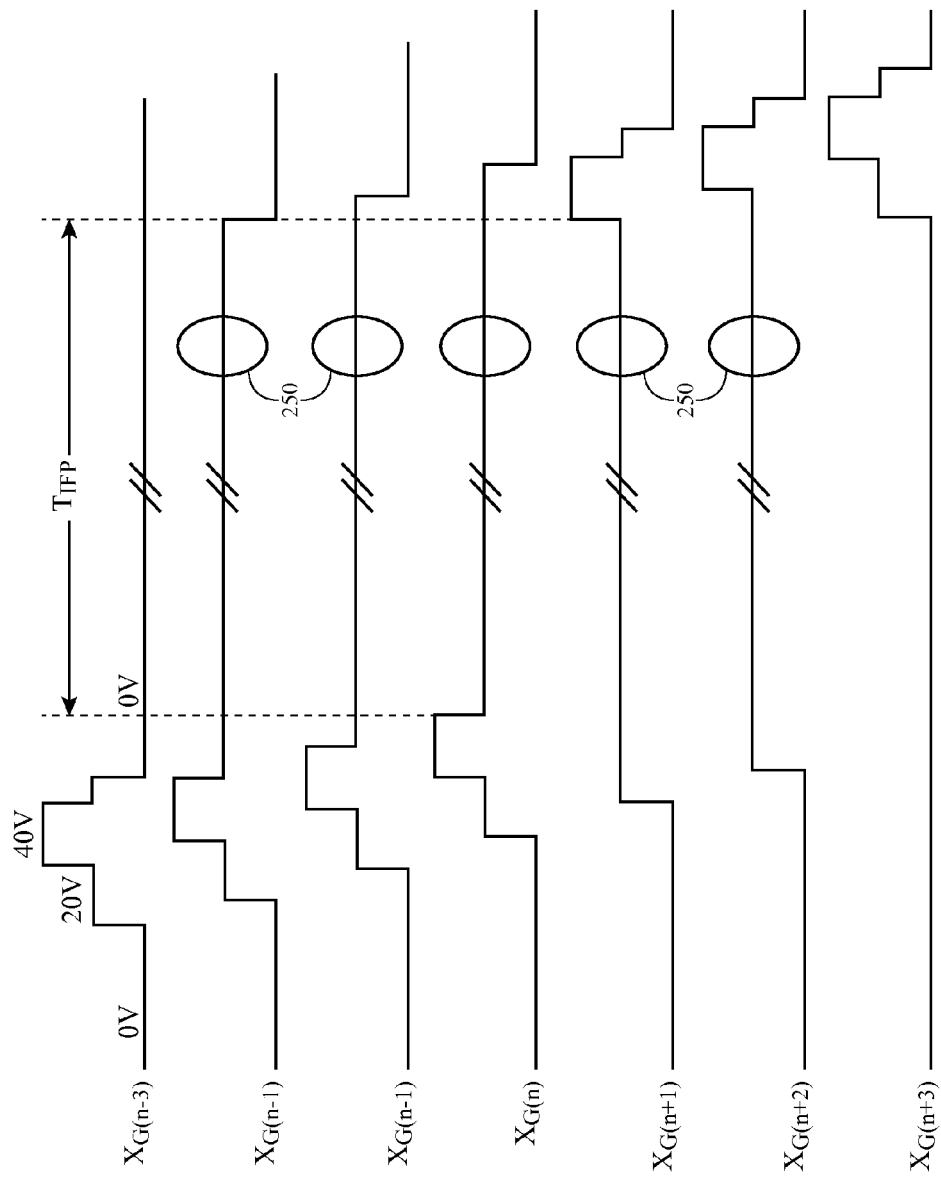
FIG. 9 is a timing diagram illustrating the operation of the conventional gate driver unit of FIG. 8.

FIG. 9 is a timing diagram showing the waveform at node X in a series of conventional gate driver units 200. In particular, consider the voltage $X_{G(n-3)}$ at node X in gate driver unit (n−3). Voltage $X_{G(n-3)}$ may rise from 0 V to 20 V when the gate output from a preceding unit is asserted (i.e., the asserted gate output routed from the preceding unit via path 212 will turn on transistor 208 to pull up $X_{G(n-3)}$). Voltage $X_{G(n-3)}$ may then rise from 20 V to 40 V when the clock signal is asserted (i.e., the incoming clock pulse will enable transistor 202 to pull up $X_{G(n-3)}$). When signal CLK is deasserted. $X_{G(n-3)}$ will fall accordingly hack to 20 V. Voltage $X_{G(n-3)}$ is then reset hack down to zero volts when the gate output from a succeeding unit is asserted (i.e., the asserted gate output routed from the succeeding unit via path 214 will turn on transistor 210 to pull down $X_{G(n-3)}$).

In this particular scenario, each gate driver unit 200 is reset by a succeeding gate driver unit 200 that is three rows below that gate driver unit. For example, voltage only reset to ground when G(n+1) is asserted. When implementing an intra-frame pause in this scenario, it is possible for at least some voltages $X_G$ to be partially asserted during the IFP blanking interval. As indicated 1w portions 250 in FIG. 9, voltages $X_{G(n-2)}$, $X_{G(n-2)}$, $X_{G(n)}$, $X_{G(n+1)}$, and $X_{G(n+2)}$ may be biased at 20 V for the entirety of the IFP interval assuming the IFP is inserted after G(n) is asserted. As described above, voltage $X_{G(n-2)}$ is only driven back down to zero voltages when G(n+1) is asserted, which can only occur after $T_{IFP}$ since all gate clocking signals are suspending during the blanking interval. Similarly, voltage $X_{G(n-1)}$ is only driven back down to zero voltages when G(n+2) is asserted, which can only occur after $T_{IFP}$. In other words, voltage $X_G$ for gate driver units 200 near the IFP location will be at least partially asserted doming the IFP interval.

As illustrated by FIG. 9, node X in gate driver units 200 surrounding the IFP location may be subject to elevated stress levels for a substantially longer period of time relative to gate driver units 200 further away from the lip position. Subjecting transistor 202 to elevated stress levels can result in degraded drive strength of gate driver unit 200, which can cause image artifacts near the IFP row position and other undesirable reliability issues for the display.

Figure 10:
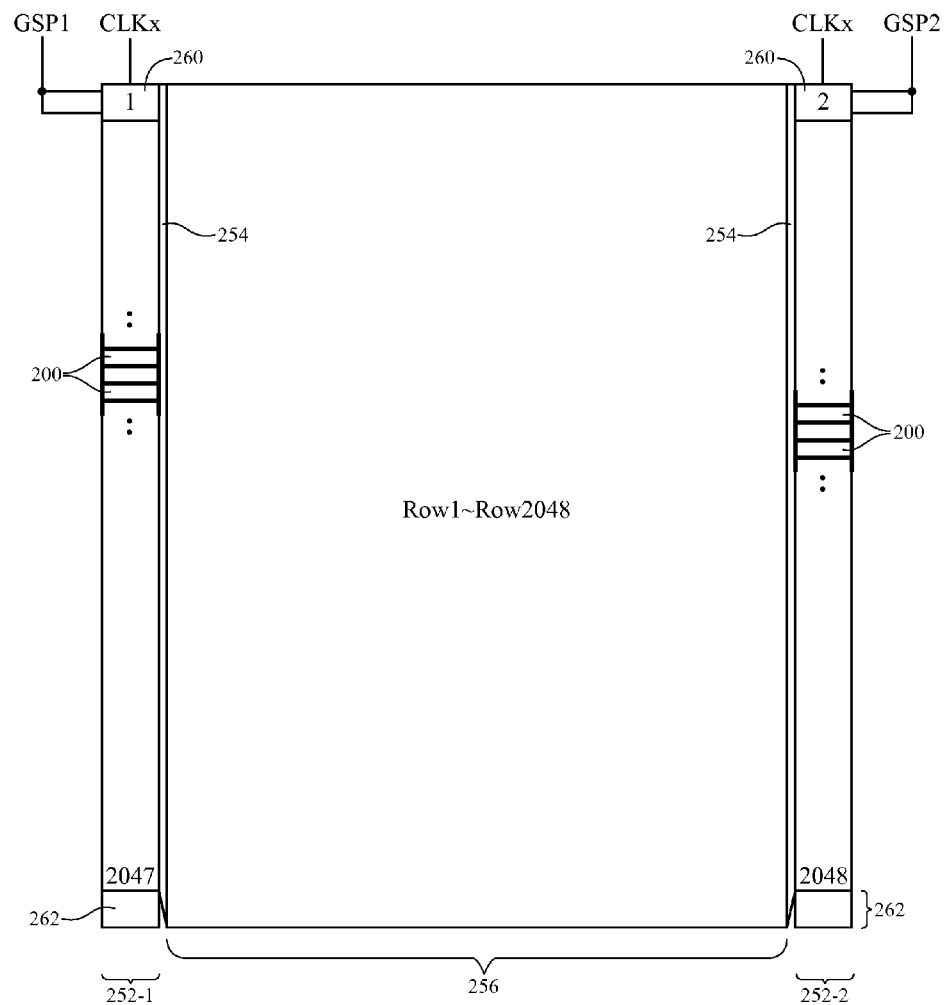
FIG. 10 is a top view of a conventional display element array having a single gate driver chain firmed on each of two opposing sides of the array.

FIG. 10 is a diagram of a conventional LCD display pixel array 256 that is coupled to gate driver circuits implemented using gate driver units 200. As shown in FIG. 10 gate driver circuits 252-1 and 252-2 are coupled to array 256 via associated routing circuitry 254. Each gate driver circuit 252 (i.e., circuits 252-1 and 252-2) includes 1024 gate driver units 200 connected in a chain. The 1024 gate driver units 200 in gate driver circuit 252-1 are used to provide gate line output signals to the 1024 odd-numbered rows in array 256, whereas the 1024 gate driver units 200 in gate driver circuit 252-2 are used to provide gate line output signals to the 1024 even-numbered rows in array 256.

In each gate driver circuit 252, a first group of dummy gate driver units 260 are coupled to the top of the chain, and a second group of dummy gate driver units 262 are coupled to the bottom of the chain. These "dummy" gate driver units are not actively coupled to the display pixels in array 256 (i.e., they do nut have outputs that are directly connected to the image pixels). Gate driver units 260 may serve as dummy units to properly initialize the active gate driver units 200 (i.e., to send appropriate initialization signals to the leading gate driver units 200 in the chain path 212 as shown in FIG. 8). Gate driver units 262 may serve as dummy units to properly reset the trailing gate driver units 200 in the chain via use of path 214. Without units 260, the first few gate driver units 200 won't be properly initialized at the beginning of a given frame. Without units 262, the last few gate driver units 200 won't be properly reset at the end of the given frame.

Each of circuits 252-1 and 252-2 are controlled by respective clock signals CLKx. Gate driver circuit 252-1 may be activated by gate start pulse signal GSP1, which triggers the clock signals that are controlling circuit 252-1 to start toggling. Similarly, gate driver circuit 252-2 may be activated by gate start pulse signal GSP2, which triggers the clock signals that are controlling circuit 252-2 to start toggling. Gate driver circuitry implemented using this conventional approach may suffer from reliability issues described in connection with FIG. 9. For example, images displayed using the circuitry of FIG. 10 may exhibit undesired color artifacts at one or more IFP locations in array 256.

Figure 11:
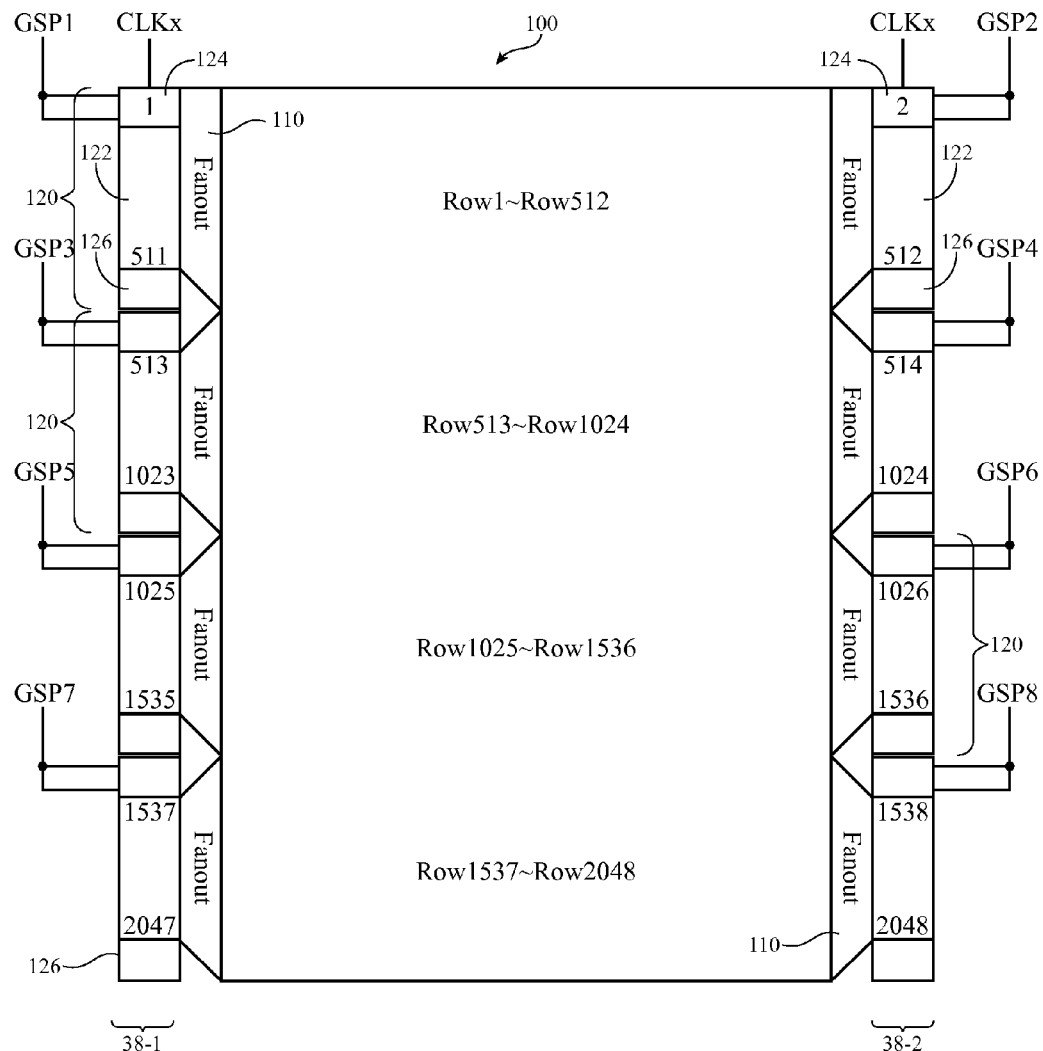
FIG. 11 is a top view of an illustrative display element array having multiple gate driver chains formed on each of two sides of the array in accordance with an embodiment of the present invention.

In one suitable arrangement, the gate driver circuits may be divided into multiple individual segments, each of which is responsible for driving respective rows in the display pixel array 100. FIG. 11 shows an example where the gate driver circuitry is split on opposing sides of array 100. As shown in FIG. 11, first gate driver circuit 38-1 may be formed on one side of array 100 to drive the odd-numbered rows (e.g., rows 1, 3, 5, . . . , 2047), whereas second gate driver 38-2 may be formed on an opposing side of array 100 to drive the even-number rows (e.g., row's 2, 4, 6, . . . , 2048).

In particular, each of gate driver circuits 38-1 and 38-2 may include multiple gate driver segments 120. Each gate driver segment 120 may include a series of gate driver units 122 (e.g., gate driver units 122 connected in a chain) and associated dummy gate driver units 124 and 126. One or more gate driver units 124 may be formed at the outer of the segment and may serve as dummy units for initializing the first few active gate driver units 122 in the chain. One or more gate driver units 126 may be formed at the end of the segment and may serve as dummy units for resetting the last few active gate driver units 122 in the chain. The active gate driver units 122 in each segment 120 may be coupled to corresponding rows in array 100 is routing circuitry 100 (sometimes referred to as "fallout" circuitry) whereas the dummy gate driver units 124 and 126 have outputs that are not actively coupled to array 100. The number of dummy gate driver units 124 and 126 that are required in each gate driver segment 120 may depend on the particular feed-forward and feed-back routing configuration among the active gate driver units (FIGS. 7A and 7B).

Each gate driver segment 120 may be separately controlled by a respective gate start pulse signal. In the example of FIG. 11, a first segment 120 in circuit 38-1 is controlled by GSP1; a second segment 120 in circuit 38-1 is controlled by GSP3; a third segment 120 in circuit 38-1 is controlled by GSP5; and a fourth segment 120 in circuit 38-1 is controlled by GSP7. Similarly, circuit 38-2 may include a first segment 120 that is controlled by GSP2, a second segment 120 that is controlled by GSP4; a third segment 120 that is controlled by GSP6; and a fourth segment 120 that is controlled by GSP8. Connected in this way, the IFP location is fixed. In other words, the IFP may only be inserted at the junction of two adjacent gate driver segments 120.

In general, each circuit 38-1 and 38-2 may include any number of gate driver segments 120 for implementing any desired number of IFPs at predetermined row locations in array 100. The duration of each IFP may also be individually adjusted by controlling when the gate start pulses are launched. For example, the first IFP duration between rows 512 and 513 merely can be adjusted by delaying when GSP3 and GSP4 are launched b the desired amount. If desired, a similar multi-segment approach can be implemented for gate driver circuitry that is formed on only one side of array 100 (FIGS. 6A and 6B).

Configured in this way, none of the transistors in the active gate driver units 122 will suffer from elevated stress levels since the gate output signals are allowed to keels propagate down the entire chain in each segment 120 without interruption. In other words, no transistor in gate driver units 122 will be subject to a prolonged level of applied stress during IFP intervals since during blanking intervals, an active gate driver unit 122 should have already been reset b dummy units 126, and the IFP interval can be arbitrarily extended by holding the next gate start pulse.

In another suitable arrangement, a first gate driver circuit 130 may be formed on one side of array 100, and second gate driver circuit 130 may be formed on an opposing side of array 100 (see, e.g., FIG. 12) First gate driver circuit 130 may be configured to drive the odd-numbered rows (e.g., rows 1, 3, 5, . . . , 2047), whereas second gate driver circuit 130 may be configured to drive the even-number rows (e.g., rows 2, 4, 6 . . . , 2048).

Each gate driver circuit 130 may include a single chain of active gate driver units 122. One or more gate driver units 124 may be formed at the front of the chain and may serve as dummy units for initializing the first few active gate driver units 122 in the chain. One or more gate driver units 126 may be formed at the end of the chain and may serve as dummy units for resetting the last few active gate driver units 122 in the chain. The number of dummy gate driver units 124 and 126 that are required in each gate driver segment 120 may depend on the particular feed-forward and feed-back routing configuration among the active gate driver units (FIGS. 7A and 7B).

In particular, at least some dummy or "redundant" gate driver units 132 may be interposed in the chain and may serve as buffer units for propagating the gate line output signals during the IFP blanking intervals. The active gate driver units 122 may be coupled to corresponding rows in array 100 via fallout routing circuitry 100, whereas the interposing dummy gate driver units 132 have outputs that are not actively coupled to array 100. The number of dummy gate driver units 132 formed may depend on the duration of each IFP interval and may depend on the frequency and location of the each IFP.

Figure 12:
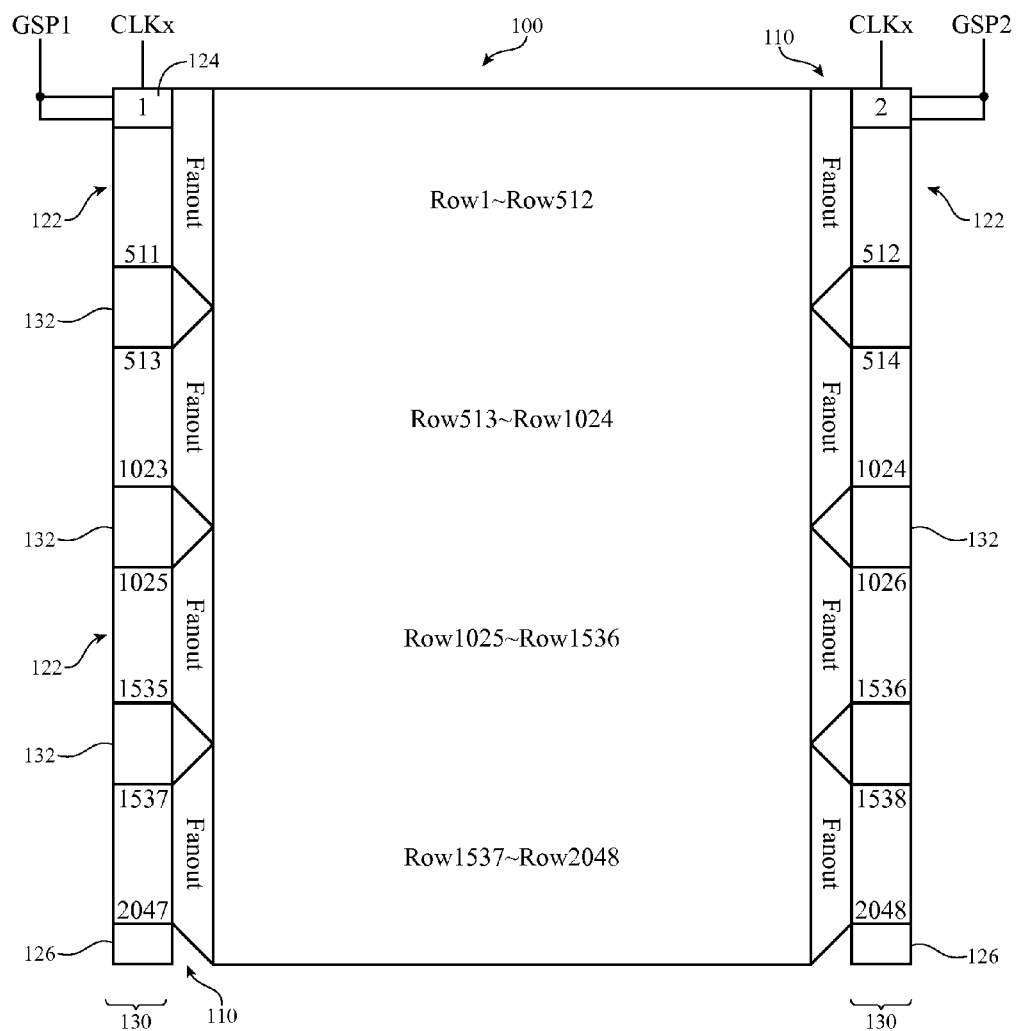
FIG. 12 is a top view of an illustrative display element array having a single gate driver chain, with multiple dummy gate driver units interposed in the chain, formed on each of two sides of the array in accordance with an embodiment of the present invention.

Each gate driver circuit 130 may be controlled by a respective gate start pulse signal. In the example of FIG. 12, first gate driver circuit 130 may be controlled by GSP1, whereas second gate driver circuit 130 may be controlled by GSP2. When the gate start pulse is launched, the gate driver units 122 may sequentially assert the gate line output signals (e.g., the gate line pulse may propagate down the gate line driver chain). The time when the gate line output signals are being conveyed through buffer gate driver units 132 should correspond to the IFP blanking interval. Configured in this way, the IFP location is fixed. In other words, the IFP may only be inserted where the dummy gate driver units 132 are formed in the chain.

In general, circuit 130 may include any number of interposing dummy gate driver units 132 for implementing any desired number of IFPs at predetermined row locations in array 100. The duration of each IFP may also be individually adjusted by temporarily pausing the gate clock signals CLKs during the IFP blanking intervals. If desired, a similar approach can be implemented for gate driver circuitry that is formed on only one side of array 100 (FIGS. 6A and 6B).

Configured in this way, none of the transistors in the active gate driver units 122 will suffer from elevated stress levels since the gate output signals are allowed to freely propagate down the entire chain in each circuit 130 without interruption. Even if the gate clock signals are paused, only the transistors in the dummy buffer units 132 are affected, which helps to reduce any undesired color artifacts in array 100. In other words, no transistor in gate driver units 122 will be subject to a prolonged level of applied stress during IFP intervals since during blanking intervals, any active gate driver unit 122 should have already been reset by dummy units 132, and the IFP interval can be arbitrarily extended by pausing the gate clock signals.

Figure 13:
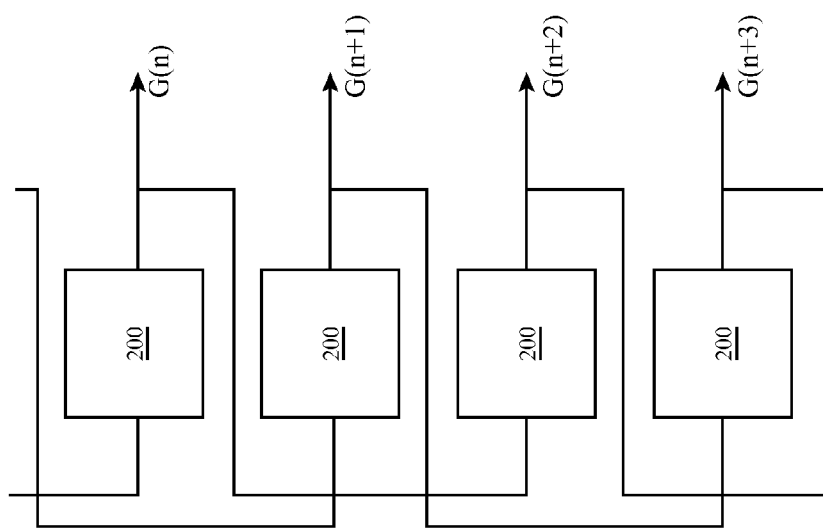
FIG. 13 is a diagram of a gate driver chain implemented using the conventional gate driver unit of FIG. 8.

Referring now to FIG. 13, gate driver units such as conventional gate driver units 200 are typically connected in a chain with some feed-forward and feed-back routing configuration. As described above in connection with FIGS. 8 and 9, transistor 202 in gate driver units 200 around the IFP location(s) are subject to elevated stress levels.

Figure 14:
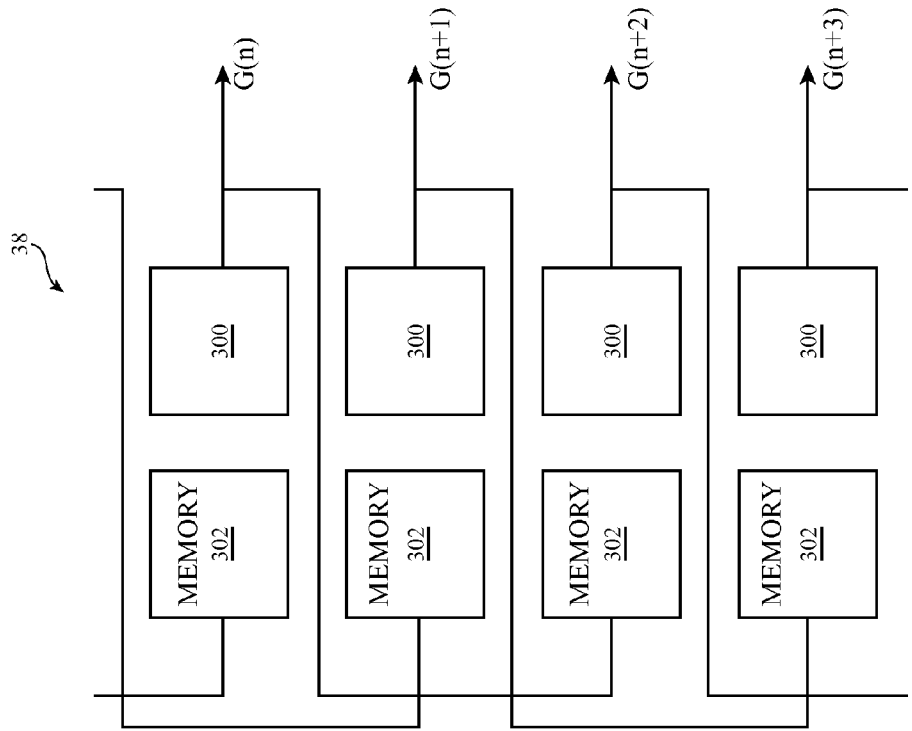
FIG. 14 is a diagram of illustrative gate driver circuitry having gate driver units with Integrated memory elements in accordance with an embodiment of the present invention.

One way to reduce this undesired stress on the relevant driving transistors in the gate driver units is to include an additional storage portion to each active gate driver unit. FIG. 14 shows an example in which a gate driver circuit 38 includes active gate driver units 300 coupled in series, where each active gate driver unit 300 is provided with memory circuitry 302. Memory 302 can be considered as part of each gate driver unit 300. Each memory circuitry 302 may serve to store or buffer the gate output pulse from a preceding gate driver unit so that undesired stress present during IFP intervals is only applied to transistors in memory portion 302 and not the active driving transistors that are directly connected at the output of each gate driver unit 300.

Figure 15:
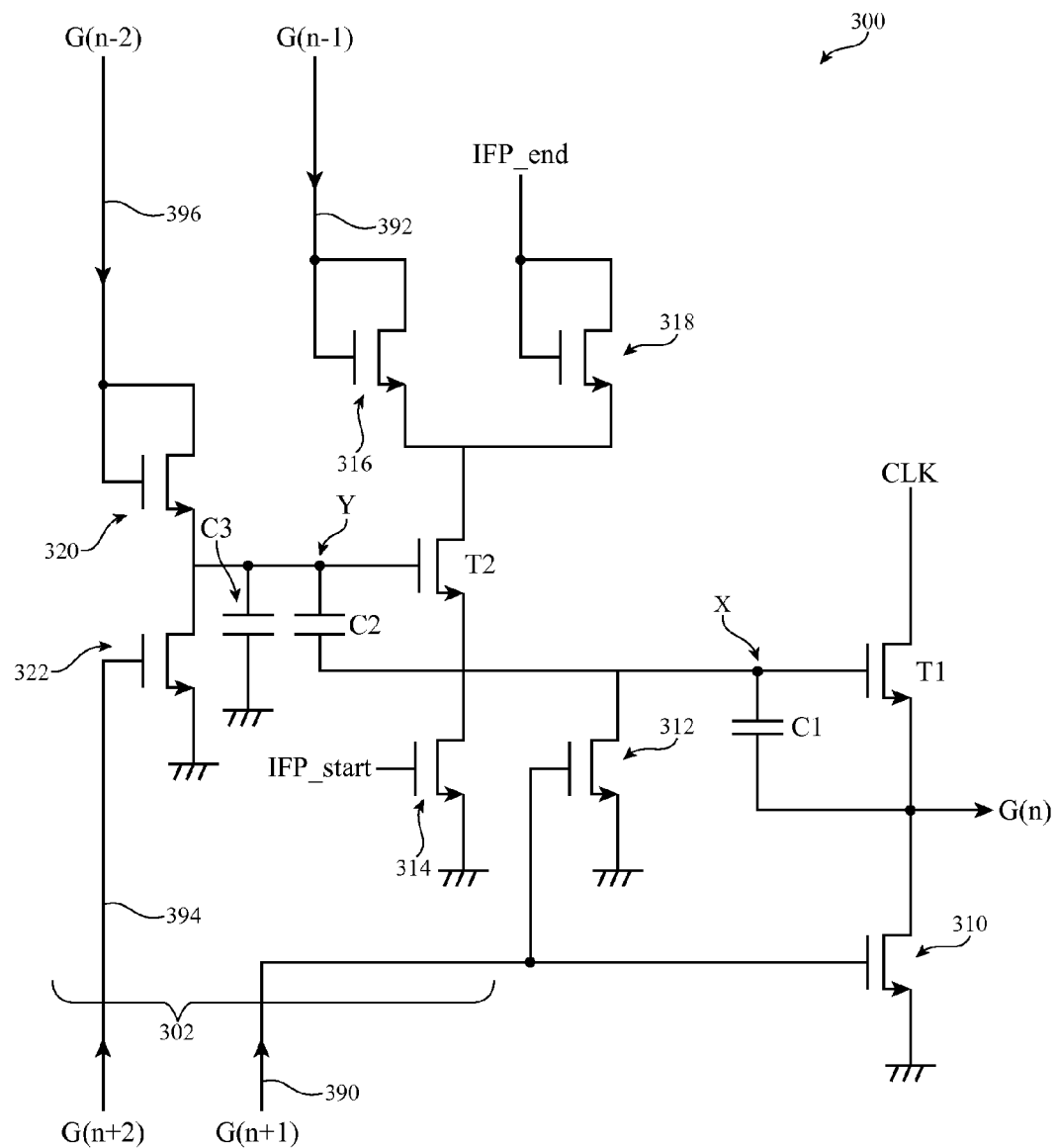
FIG. 15 is a circuit diagram of an illustrative gate driver unit with integrated memory circuitry in accordance with an embodiment of the present invention.

FIG. 15 is a circuit diagram of an illustrative gate driver unit 300 that includes buffer portion 302. As shown in FIG. 15, gate driver unit 300 may include capacitors C1, C2, and C3 and n-channel transistors T1, T2, 310, 312, 314, 316, 318, 320, and 322. Transistor T1 may have a drain terminal that receives gate clock signal CLK, a source terminal that is directly coupled to the output terminal of unit 300 (e.g., the output on which gate line signal G(n) may be generated), and a gate terminal that is coupled to a first intermediate node X. The source and drain terminals of the n-channel transistors may sometimes be referred to interchangeably as source-drain terminals. Capacitor C1 (sometimes referred to as a bootstrapping capacitor) may be coupled between node X and the output of unit 300.

Transistor 310 may have a drain terminal that is coupled to the coupled to unit 300, a source terminal that is coupled to a power supply terminal (e.g., a power supply terminal on which a ground power supply signal is provided), and a gate terminal. Transistor may have a drain terminal that is coupled to node X, a source terminal that is coupled to the power supply terminal, and a gate terminal. The gate terminals of transistors 310 and 312 may be coupled to a feed-back path on which gate output signal G(n+1) is routed back from the immediate subsequent gate driver unit via path 390.

Transistor 314 may have a drain terminal that is coupled to node X, a source terminal that is coupled to the power supply terminal, and a gate terminal that receives signal IFP_start. Signal IFP_start may be asserted to signify the start of an IFP blanking interval. Transistor T2 may have a drain terminal, a source terminal that is coupled to node X, and a gate terminal that is coupled to a second intermediate node Y. Capacitor C2 (another bootstrapping capacitor) may be coupled between node Y and node X. Capacitor C3 may have a first terminal that is coupled to node Y and a second terminal that is coupled to the power supply terminal. Capacitor C3 may be used to prevent the voltage at node Y from being raised too high during operation of unit 300. The voltage of node Y can be adjusted by changing the ratio of C2 to C3 (e.g., C3 can be increased relative to C2 to lower the maximum voltage at node Y).

Transistor 318 may have a source terminal that is coupled to the drain terminal of transistor T2, a drain terminal, and a gate terminal that is shorted to its drain terminal. The gate and drain terminals at transistor 318 may receive signal IFP_end. Signal IFP_end may be asserted to signify the end of an IFP blanking interval. Transistor 316 may have a source terminal that is coupled to the drain terminal of transistor T2, a drain terminal, and a gate terminal that is shorted to its drain terminal. The gate and drain terminals of transistor 316 may be coupled to a feed-forward path on which gate output signal G(n-1) is routed from the immediate preceding gate driver unit in path 392.

Transistor 320 may have a source terminal that is coupled to node Y, a drain terminal, and a gate terminal that is shorted to its drain terminal. The gate terminal of transistor 320 may be coupled to a feed-forward path on which gate output signal G(n-2) is routed from a preceding gate driver unit that is two rows above via, path 396. Transistor 322 may have a drain terminal that is coupled to node Y, a source terminal that is coupled to the power supply line, and a gate terminal that is coupled to a feed-back path on which gate output signal G(n+2) is routed back from a succeeding gate driver unit that is two rows below via path 394.

Connected in this way, components 320, 322, 318, T2, 314, and C2 may be considered to be part of memory circuitry 302, which serves to provide buffering capabilities for gate driver unit 300. The particular row numbering scheme in the example of FIG. 15 pertains to the single-sided gate driver configuration in which gate driver units that drive both even and odd rows are formed on one side of the display pixel array. If desired gate driver unit 300 may also be used in the split gate driver configuration in which gate driver units that drive odd rows are formed on one side of the array while gate driver units that drive even rows are formed on an opposing side of the array. In the split gate driver configuration, G(n+2) may be provided on path 390; G(n+4) may be provided on path 394; G(n-2) may be provided on path 392; and G(n-4) may be provided on path 396.

Figure 16B:
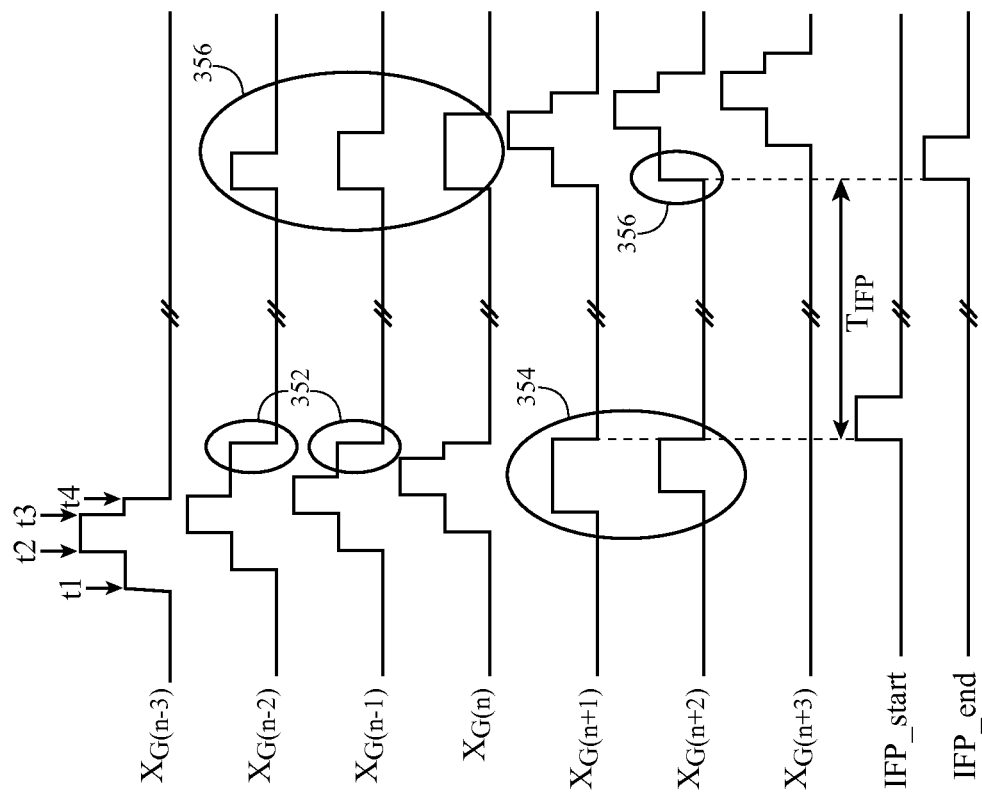
FIGS. 16A and 16B are timing diagrams illustrating the operation of gate driver units of the type shown in FIG. 15 in accordance with an embodiment of the present invention.
Figure 16A:
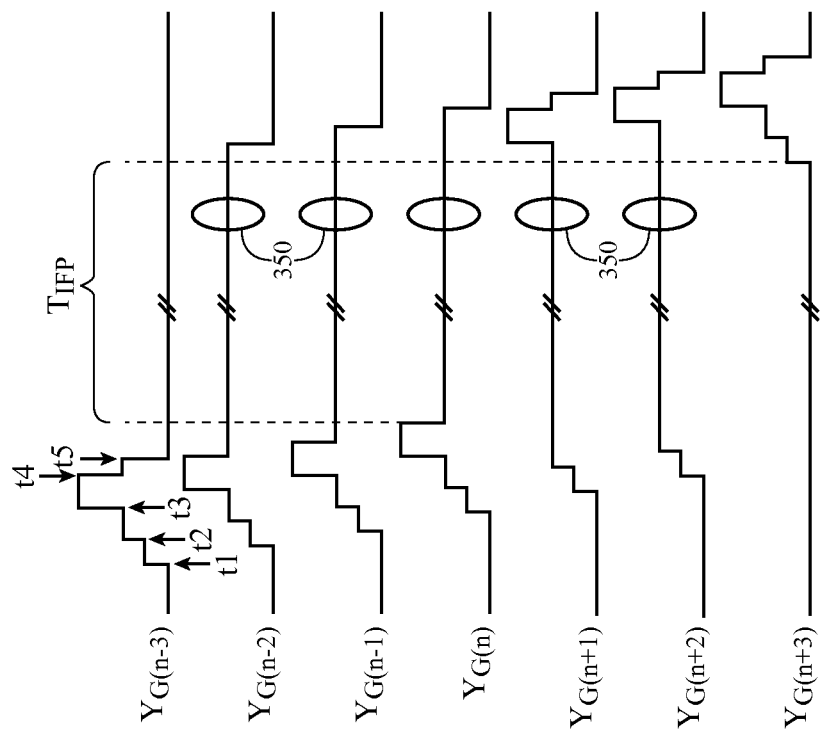

FIGS. 16A and 16B are timing diagrams showing the waveform at node Y and X, respectively in a series of active gate driver units 300. In particular, consider the voltage $Y_{G(n-3)}$ at node Y in gate driver unit (n-3). At time t1, voltage $Y_{(G(n-3)}$ may rise by a first amount when the gate output from one of the preceding units is asserted (i.e., when G(n-2) on feed-forward path 396 is asserted to turn on transistor 320 to pull up $Y_{G(n-3)}$. At time t2, voltage $Y_{G(n-3)}$ may rise by a second amount when the gate output from another one of the preceding units is asserted (i.e., when G(n-1) on teed-forward path 392 is asserted to turn on transistor 316 to pull up $Y_{G(n-3)}$). At time t3 voltage $Y_{G(n-3)}$ may rise by a third amount when signal CLK is asserted (i.e., the incoming gate clock pulse will enable transistor T1 to pull up $Y_{G(n-3)}$)).

At time t4 when signal CLK is deasserted, $Y_{G(n-3)}$ will be reduced by the third amount. At time t5, voltage $Y_{G(n-3)}$ may be reset when the gate output hum one of the succeeding units is asserted (i.e., G(n+2) on feed-back path 394 is asserted to turn on transistor 322 to pull down $Y_{G(n-3)}$). In this particular example, node Y is reset by a succeeding gate driver output that is two rows below that gate driver unit 300. For example, voltage $Y_{G(n-2)}$ may be reset to ground when G(n) is asserted. When implementing an intra-frame pause in this scenario, it is possible for at least some voltages $Y_G$ to be partially asserted during $T_{IFP}$. As indicated by portions 350 in FIG. 16A, voltages $Y_{G(n-2)}$, $Y_{G(n-1)}$, $Y_{G(n+1)}$, and $Y_{G(n+2)}$ may be partially asserted for the entirety of the IFP blanking interval assuming the IFP is inserted after G(n) is pulsed.

This may be acceptable since partial assertion of node Y mostly stresses transistor T2 and not transistor T1 (e.g., the gate output waveform is less sensitive to T2 degradation). In particular, consider the voltage $X_{G(n-3)}$ at node X in gate driver unit (n-3) as shown in FIG. 16B. At time t1, voltage $X_{G(n-3)}$ may rise by a first amount when the gate output from one of the preceding units is asserted (i.e., when G(n-1) on feed-forward path 392 is asserted to turn on transistor 316 to pull up $X_{G(n-3)}$). At time t2, voltage $X_{G(n-3)}$ may rise by a second amount when signal CLK is asserted (i.e., the incoming gate clock pulse will enable transistor T1 to pull up $X_{G(n-3)}$). At time t3 when signal CLK is deasserted, $X_{G(n-3)}$ will be reduced by the second amount. At time t4, voltage $Y_{G(n-3)}$ may be reset when the gate output from one of the succeeding units is asserted (i.e., when G(n+1) on feed-back path 390 is asserted to turn on transistor 312 to pull down $X_{G(n-3)}$.

At the beginning of the IFP interval, signal IFP_start may be asserted to activate transistor 314 to reset node X (e.g., signal IFP_start may be pulsed high to pull node X down to logic zero) in all of gate driver units 300. As shown by portions 352 and 354, voltage $X_G$ are all driven to the reset level at the beginning of the IFP blanking interval. During $T_{IFP}$, the previous gate output signal may be temporarily stored at buffering node Y.

At the end of the IFP interval, signal IFP_end may be asserted to charge up node X (as shown by portions 356) to restart the gate output sequence. Signals IFP_start and IFP_end may be global signals that control each gate driver unit 300 in the gate driver circuitry. As illustrated in the timing diagram of FIG. 16B, voltage $X_G$ is not asserted during the IFP blanking interval, and as a result, transistor T1 is not subject to any prolonged stress during $T_{IFP}$. The use of memory circuitry 302 (FIG. 15) to buffer previous gate outputs at node Y can therefore effectively mitigate any reliability concerns on transistor T1 during IFP events.

Referring back to FIG. 8, the conventional gate driver unit 200 only uses one feed-forward path 212. As described previously in connection with FIG. 10, dummy gate drivers 260 may required a single gate start pulse for initializing the leading active gate driver units 200. In the scenario in which split gate driver circuits are implemented, a first GSP1 is needed to activate gate driver circuit 252-1, and a second GSP2 is needed to activate gate driver circuit 252-2.

Figure 17:
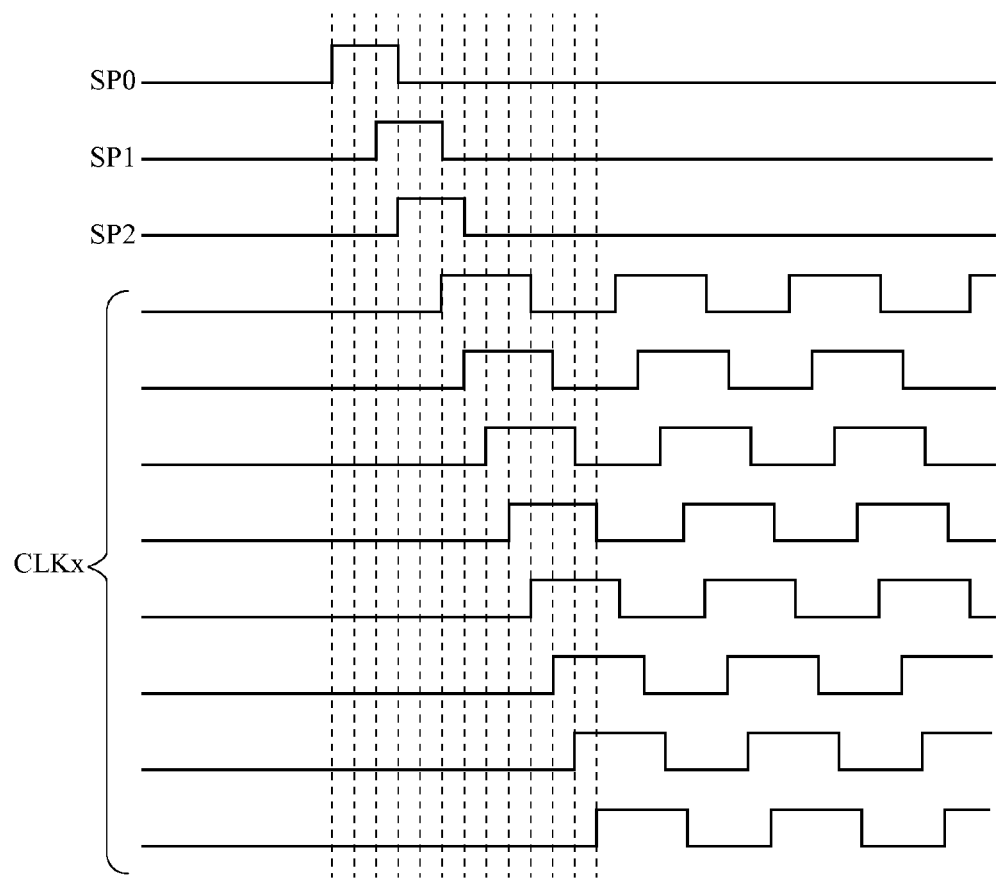
FIG. 17 is a timing diagram showing illustrative control signals used in operating a display element array implemented using gate driver units of the type shown in FIG. 15 in accordance with an embodiment of the present invention.

Referring now to FIG. 15, the improved gate driver unit 300 having integrated memory circuitry 302 may have to feed-forward paths 392 and 396. As described previously memory connection with FIG. 12 dummy gate drivers 124 may require at least one gate start pulse for initializing the leading active gate driver units 300. When gate driver units 300 are used however, at least two gate start pulses are needed to feed into the two feed-forward paths for the first dummy gate driver 124. FIG. 17 shows a scenario in which the split gate driver configuration is implemented using gate driver units 300. As shown in FIG. 17, a minimum of three gate start pulses may be required to initialize the split gate circuits. For example signal SP1 may be used to jump start first gate circuit 130 on the left of array 100, whereas signal SP2 may be used to jump start second gate circuit 130 on the right of array 100 (see, FIG. 12). Signal SP0 may be shared and may be used to start both circuits 130.

Gate driver unit 300 of FIG. 15 is sometimes referred to as a "bootstrap" driver unit and is merely illustrative and does not serve to limit the scope of the present invention. If desired, gate driver circuitry may be implemented using other types of gate driver units such as CMOS latch-based gate driver units, gate driver units formed using low-temperature polycrystalline silicon (LTPS) structures, and/or other types of driver circuitry.

The foregoing is merry illustrative of the principles of this invention and various modifications can be made by those skilled in the art without departing from the scope and spirit of the invention. The foregoing embodiments may be implemented individually or in any combination.

What is claimed is:

1. An electronic device, comprising:
    a display pixel array;
    gate driver circuitry that is coupled to the display pixel array, wherein operation of the gate driver circuitry is temporarily suspended during an intra-frame blanking interval, wherein the gate driver circuitry comprises a memory circuit that is controlled by a start signal and an end signal, wherein the start signal is asserted at a beginning of the intra-frame blanking interval, and wherein the end signal is asserted at an end of the intra-frame blanking interval; and
    touch sensing circuitry that is activated during the intra-frame blanking interval.

2. The electronic device defined in claim 1, wherein the gate driver circuitry further includes a gate driver circuit formed on one side of the display pixel array.

3. The electronic device defined in claim 2, wherein the gate driver circuitry further includes another gate driver circuit formed on an opposing side of the display pixel array.

4. The electronic device defined in claim 2, wherein the gate driver circuit includes a plurality of gate driver segments each of which is controlled by a respective gate start signal.

5. The electronic device defined in claim 4, wherein each gate driver segment in the plurality of gate driver segments includes a series of active gate driver units, a first dummy gate driver unit coupled to a leading active gate driver unit in the series of active gate driver units, and a second dummy gate driver unit coupled to a trailing active gate driver unit in the series of active gate driver units.

6. A method of operating an electronic device that includes display circuitry, gate driver circuitry having a transistor controlled by a start signal, and touch sensing circuitry, comprising:
    activating the gate driver circuitry associated with the display circuitry during first and second display intervals to load a given frame into the display circuitry;
    loading a first sub-frame of the given frame into the display circuitry during the first display interval with the gate driver circuitry;
    loading a second sub-frame of the given frame into the display circuitry during the second display interval with the gate driver circuitry;
    turning on the transistor to reset an intermediate node in the gate driver circuitry by asserting the start signal, wherein asserting the start signal begins an intra-frame blanking interval; and
    activating the touch sensing circuitry during the intra-frame blanking interval that occurs after the first display interval and before the second display interval.

7. The method defined in claim 6, wherein the gate driver circuitry includes a gate driver circuit formed on one side of a display pixel array, the method further comprising:
    controlling the gate driver circuit with at least one gate clock signal.

8. The method defined in claim 7, further comprising:
    controlling the gate driver circuit with a plurality of individually controlled gate start signals.

9. The method defined in claim 8, wherein the plurality of individually controlled gate start signals includes a first gate start signal and a second gate start signal, and wherein controlling the gate driver circuit with the plurality of individually controlled gate start signals comprises:
    asserting the first gate start signal to initiate the first display interval; and
    asserting the second gate start signal to initiate the second display interval.

10. The method defined in claim 6, wherein the gate driver circuit includes a chain of gate driver units each of which includes at least first, second, third, and fourth inputs, the method further comprising:
    with the first and second inputs of a given gate driver unit in the chain of gate driver units, receiving gate line output signals from two different preceding gate driver units in the chain; and
    with the third and fourth inputs of the given gate driver unit, receiving gate line output signals from two different succeeding gate driver units in the chain.

11. An electronic device, comprising:

an array of display pixels arranged in rows and columns; and gate driver circuitry coupled to the array of display pixels, wherein operation of the gate driver circuitry is temporarily suspended during an intra-frame blanking interval, wherein the gate driver circuitry includes a gate driver unit having an output on which a corresponding gate line output signal is provided to display pixels arranged along a corresponding row in the array, and wherein the gate driver unit comprises:

a transistor having a source-drain terminal that is coupled to the output of the gate driver unit and a gate terminal; and a pull-down circuit that is coupled to the gate terminal of the transistor and that is activated prior to the intra-frame blanking interval to reset any existing voltage level at the gate terminal of the transistor.

12. The electronic device defined in claim 11, wherein the gate driver unit comprises one gate driver unit in a chain of gate driver units in the gate driver circuitry, and wherein the gate driver unit further comprises:

memory circuitry for buffering gate line output signals from at least one preceding gate driver unit in the chain.

13. The electronic device defined in claim 12, wherein the gate driver unit directly receives gate line output signals from at least two different preceding gate driver units in the chain.

14. The electronic device defined in claim 12, wherein the memory circuitry includes an additional transistor having a source-drain terminal that is coupled to the gate terminal of the transistor and a gate terminal, and wherein the gate driver unit further comprises:

a first bootstrapping capacitor coupled between the gate terminal and the source-drain terminal of the transistor; and a second bootstrapping capacitor coupled between the gate terminal and the source-drain terminal of the additional transistor.

15. The electronic device defined in claim 14, wherein the gate driver unit further comprises:

a pull-up transistor that is coupled in series with the additional transistor, wherein the pull-up transistor is activated at the end of the intra-frame blanking interval to restore charge at the gate terminal of the transistor.

16. The electronic device defined in claim 12, wherein the gate driver unit directly receives gate line output signals from at least two different succeeding gate driver units in the chain.

* * * * *